US011945129B2

(12) United States Patent
Nakada

(10) Patent No.: US 11,945,129 B2
(45) Date of Patent: Apr. 2, 2024

(54) INTIMATE AREA THINNING RAZOR

(71) Applicant: KAI R&D CENTER CO., LTD., Seki (JP)

(72) Inventor: Keita Nakada, Seki (JP)

(73) Assignee: KAI R&D CENTER CO., LTD., Seki (JP)

( * ) Notice: Subject to any disclaimer, the term of this patent is extended or adjusted under 35 U.S.C. 154(b) by 0 days.

(21) Appl. No.: 18/494,250

(22) Filed: Oct. 25, 2023

(65) Prior Publication Data

US 2024/0051166 A1 Feb. 15, 2024

Related U.S. Application Data

(63) Continuation of application No. PCT/JP2021/039369, filed on Oct. 25, 2021.

(30) Foreign Application Priority Data

Oct. 25, 2021 (JP) ................................ 2021-173662

(51) Int. Cl.
*B26B 21/06* (2006.01)
*B26B 21/40* (2006.01)
*B26B 21/42* (2006.01)

(52) U.S. Cl.
CPC .......... *B26B 21/4031* (2013.01); *B26B 21/06* (2013.01); *B26B 21/42* (2013.01)

(58) Field of Classification Search
None
See application file for complete search history.

(56) References Cited

U.S. PATENT DOCUMENTS

2013/0199346 A1* 8/2013 Psimadas .............. B26B 21/225 83/13
2022/0339809 A1* 10/2022 Ochiai .................. A45D 24/02

FOREIGN PATENT DOCUMENTS

| | | | |
|---|---|---|---|
| JP | S6171072 | U | 5/1986 |
| JP | S6455879 | U | 4/1989 |
| JP | H06233875 | A | 8/1994 |
| JP | H10249075 | A | 9/1998 |
| JP | 6621563 | B1 | 12/2019 |
| JP | 2021069704 | A | 5/2021 |

OTHER PUBLICATIONS

International Search Report for PCT/JP2021/039369, dated Dec. 7, 2021, 2 pages.

* cited by examiner

*Primary Examiner* — Hwei-Siu C Payer
(74) *Attorney, Agent, or Firm* — STERNE, KESSLER, GOLDSTEIN & FOX P.L.L.C.

(57) ABSTRACT

An intimate area thinning razor, in which a comb portion includes comb teeth, a blade edge exposed portion where a blade edge is exposed, and a cover portion where the blade edge is covered. The comb teeth are provided at both ends in the width direction of the cover portion and between both of the ends, and a set of the blade edge exposed portion and the cover portion arranged in a predetermined manner is disposed repeatedly. A ratio of a total of lengths between center portions in the width direction of the comb teeth adjacent to the plurality of blade edge exposed portions, relative to a length between center portions in the width direction of the comb teeth at outermost positions in the width direction of the comb portion, is 1/10 to 4/10. Groove portions are formed on an extended line of a gap between the comb teeth.

5 Claims, 11 Drawing Sheets

INTIMATE AREA THINNING RAZOR

CROSS-REFERENCE TO RELATED APPLICATIONS

The present application is a continuation of International Application No. PCT/JP2021/039369, filed Oct. 25, 2021, which claims priority to Japanese Application No. 2021-173662, filed Oct. 25, 2021.

FIELD

One aspect of the present invention relates to an intimate area thinning razor.

BACKGROUND

A razor structure is known for various aspects of usage. For example, Patent Documents 1 and 2 disclose razors that assume body hair cutting treatment at so-called intimate areas, such as treatment at VIO lines including a bikini line. Patent Document 1 discloses a technique devised so as to avoid hindering a trimming operation by efficiently ejecting trimmed under-hairs. Patent Document 2 discloses a razor with improved grippability and operability for the user.

CITATION LIST

Patent Document

Patent Document 1: Japanese Utility model publication No. S61-71072

Patent Document 2: Japanese Patent No. 6621563

SUMMARY

Technical Problem

According to the research by the inventors, it has been found that when treating body hairs in intimate areas, many people feel embarrassed to remove all body hairs and there is a need of partially removing hairs to reduce the amount thereof. Furthermore, it has been found that there is also a need to ensure, when body hairs are partially removed, that the boundary between the removed part and the unremoved part is not clearly visible. In this regard, with the conventional razors, body hairs have been excessively removed, or the boundary between the removed part and the unremoved part has been clearly visible.

Moreover, when the head of a razor for removing body hairs is brought into contact with the skin to remove body hairs, the skin has entered between the comb teeth so as to easily touch the blade edge, making the user feel uncomfortable, or damaging the skin in some cases.

In response to such users' needs, the conventional razors have not been able to provide sufficient functions. Therefore, there is demanded a razor that meets the users' needs as described above.

Solution to Problem

In order to solve the above-described problems, the present invention provides the following means. In the following description, numeral symbols and the like in the drawings may be shown in brackets to facilitate understanding of the present invention. However, the components of the invention are not limited to these concrete structures, and should be interpreted widely to the range technically understood by a person skilled in the art. Note that the razor according to one aspect of the present invention may be referred to as a "thinning razor" in the present specification because it is mainly characterized by the function of thinning and reducing body hairs.

An intimate area thinning razor according to one aspect of the present invention is a thinning razor (1) for reducing an amount of hairs at an intimate area, the thinning razor including:

- a grip portion (5) that is formed to extend in a predetermined longitudinal direction and is gripped by a user;
- a head portion (3) that is formed to extend in a width direction crossing the longitudinal direction, and includes a blade body (37) and a comb portion (35) formed adjacent to the blade body; and
- a connecting portion (4) that connects the grip portion and the head portion, in which
- the comb portion includes a comb portion first component body (32) integrally formed with the head portion, and a comb portion second component body (34) provided to face the comb portion first component body, and the blade body is sandwiched between the comb portion first component body and the comb portion second component body,
- the comb portion includes a plurality of comb teeth, and includes a blade edge exposed portion (35*a*) where a blade edge of the blade body is exposed and a cover portion (35*b*) where the blade edge of the blade body is covered as not to be exposed, and the comb teeth are provided at both ends in the width direction of the cover portion and between both of the ends, and a set of the blade edge exposed portion and the cover portion arranged in a predetermined manner is disposed repeatedly,
- a ratio of a total of lengths between center portions in the width direction of the comb teeth adjacent to the plurality of blade edge exposed portions, relative to a length between center portions in the width direction of the comb teeth at outermost positions in the width direction of the comb portion, is 1/10 or larger but not exceeding 4/10,
- the comb portion second component body includes a plurality of groove portions (34*c*, 34*d*) each formed on an extended line of a gap between the comb teeth, and
- a length of the comb portion in the width direction thereof is 10 mm or larger, and the plurality of comb teeth are provided with intervals of 2 mm or smaller.

In the thinning razor with the above-described configuration, the ratio of the blade edge exposed portion where the blade edge is exposed, relative to the length in the width direction of the comb portion, is set to 1/10 or larger but not exceeding 4/10. Thus, it is possible to gradually cut body hairs to be cut while checking the situation, without removing all body hairs at once, which achieves a configuration in which only the amount desired by the user is removed while suppressing exceeding cutting.

Moreover, a plurality of comb teeth are disposed with the intervals of 2 mm or smaller, whereby the width of the blade edge exposed portion becomes relatively small, and the width for cutting body hairs at once becomes relatively narrow. In response to the above-described users' needs for the natural state with an unclear boundary between the part where body hairs are removed and the part where body hairs are not removed, the boundary between the part where body hairs are cut and the part where body hairs are not cut can be effectively blurred by setting the intervals between the comb teeth to 2 mm or smaller in this manner.

Furthermore, with the intervals between the comb teeth set to 2 mm or smaller, it is difficult for the skin to enter between the comb teeth. Therefore, it is possible to suppress the user's skin from touching the blade edge, thereby suppressing the user's discomfort or preventing the user's skin from being damaged.

The razor is configured to include a plurality of comb teeth, and in the cover portion, the comb tooth is provided not only at both ends thereof but also between both of the ends. Thus, it is possible to effectively perform combing treatment while cutting body hairs to be cut, as compared with the configuration in which the comb tooth is provided only at both ends of the cover portion. Therefore, it becomes easy to remove body hairs to be cut with the next stroke. Moreover, because the intervals between the comb teeth is 2 mm or smaller in width, body hairs can be combed with fine intervals so as to effectively adjust a coat of hair.

With a plurality of groove portions, the contact area between the head portion and the skin and body hairs is smaller, and thus the friction is reduced. Therefore, it is possible to remove body hairs while performing combing treatment on body hairs to be cut more effectively. The above-described thinning razor is mainly used for the intimate areas where the growing directions of body hairs are not constant, and such a configuration excellent in performance of combing treatment facilitates ease of cutting body hairs to be cut at the intimate areas.

In the above-described intimate area thinning razor, it is preferable that the plurality of comb teeth are formed in the comb portion first component body, and the comb portion second component body includes a concave portion at a position corresponding to the blade edge exposed portion, and a blade edge cover at a position corresponding to the cover portion.

In the thinning razor with the above-described configuration, it is possible to achieve a configuration in which the disposition and pitch of the comb teeth and the ratio of the comb teeth exposed portion and the cover portion can be changed depending on the combination of the comb portion first component body and the comb portion second component body.

In the above-described intimate area thinning razor, it is preferable that the groove portion of the comb portion second component body includes

- a first groove portion that is formed at a position continuous from the concave portion; and
- a second groove portion that is formed at a position separate from the gap of the comb teeth on an extended line of a position of the gap between the comb teeth in the blade edge cover.

In the thinning razor with the above-described configuration, the groove portions are formed in a wide range in the area where the comb teeth of the comb portion are disposed, thereby allowing the combing treatment to be performed more effectively. As a result, it becomes easier to cut body hairs more comfortably.

In the above-described intimate area thinning razor, it is preferable that the comb portion first component body includes a projection having an outer surface along an extended surface of an outer surface of the comb portion second component body, at a position facing the blade edge cover in a section view at a position where the blade edge cover is formed.

In the thinning razor with the above-described configuration, the blade edge does not directly touch the user's skin, which is a skin-friendly configuration. In particular, the above-described thinning razor is mainly used for intimate areas, and thus such a skin-friendly configuration is particularly useful.

In the thinning razor with the above-described configuration, it is preferable that a ratio of a total of lengths between center portions in the width direction of the comb teeth adjacent to the plurality of blade edge exposed portions, relative to a length between center portions in the width direction of the comb teeth at outermost positions in the width direction of the comb portion, is ⅓.

According to the research by the inventors, it has been found that with the blade edge exposed portion set to the above-described ratio, the configuration is particularly suitable for cutting the amount of body hairs desired by the user. That is, in the thinning razor with the above-described configuration, it is possible to cut the amount of body hairs desired by the user.

DESCRIPTION OF EMBODIMENTS

Figure 1:
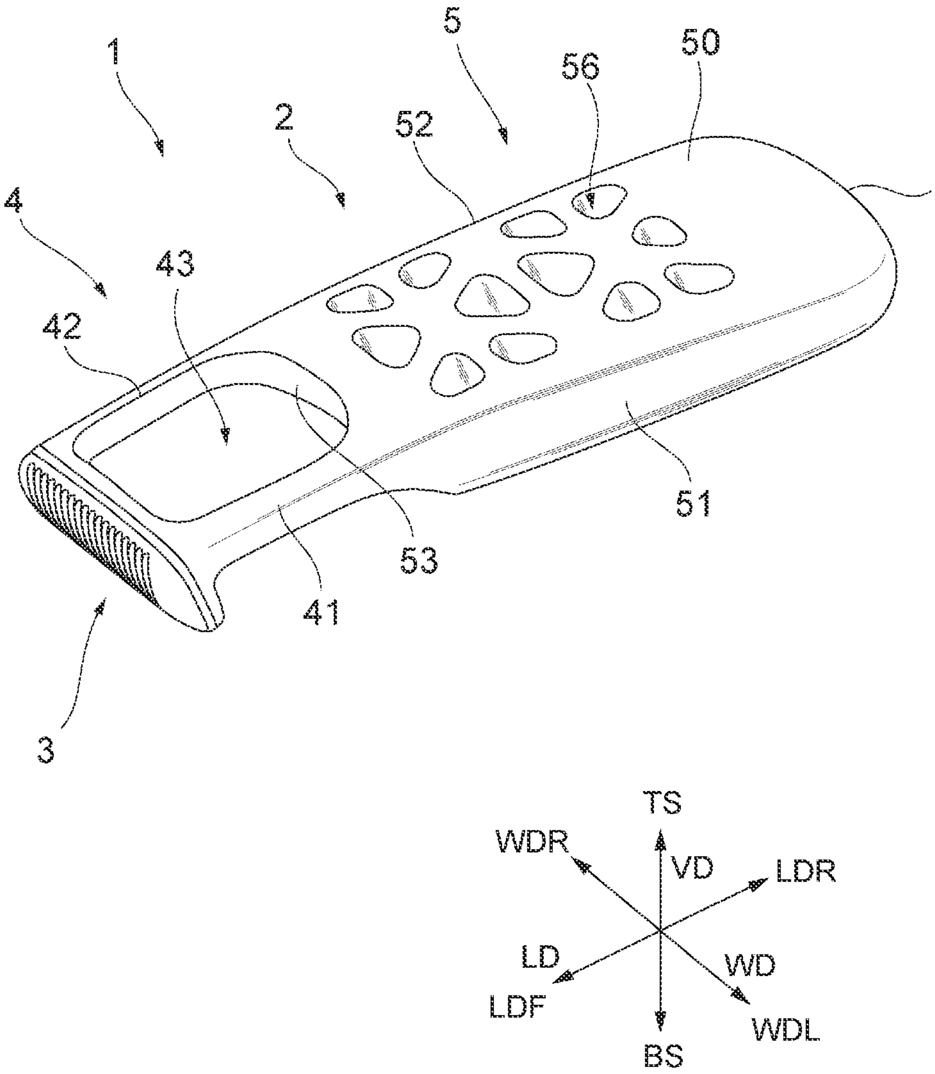
FIG. 1 is a perspective view of a razor according to an embodiment.

The intimate area thinning razor according to one embodiment of the present invention is preferably used as a razor for cutting body hairs at intimate areas such as a genital region including a so-called VIO zone. Moreover, it has a configuration excellent especially in the function of thinning body hairs so as to reduce the amount thereof at a target spot to the amount desired by the user, instead of removing all body hairs at the target spot.

The razor according to one embodiment of the present invention will be specifically described with reference to the drawings. However, the embodiments and the examples described in the following are only examples of the present invention, and do not intend restrictive interpretation of the technical range of the invention. Note that in the drawings, the same components are represented with the same numeral symbols.

Basic Configuration and Material of Razor 1

As illustrated in FIGS. 1 to 7, the razor 1 of the embodiment is formed mainly by a razor holder 2 including a head portion 3, a connecting portion 4, and a grip portion 5, and a blade body 37 held by the razor holder 2.

The head portion 3, the connecting portion 4, and the grip portion 5 in the embodiment are configured as an integrally molded body made of resin. As the resin material, polypropylene (PP), ABS, elastomer, polycarbonate (PC), polyethylene terephthalate (PET), vinyl chloride resin (PVC), or the like is suitably used. Note that in view of the recent trend toward plastic reduction, the integrally molded body may be formed using, for example, a paper material, a corrugated cardboard material, or the like, instead of the above-described resin material. Meanwhile, the blade body 37 is formed as a metal blade. In the present embodiment, a stainless steel material is used for the blade body 37.

Definition of Direction of Razor 1

In the present embodiment, the longitudinal direction connecting the head portion 3, the connecting portion 4, and the grip portion 5, that is, the long direction of the razor 1, is defined as LD. The longitudinal direction LD may be referred to as a front-rear direction. The short direction crossing the longitudinal direction LD, that is, the width direction of the razor 1, is defined as WD. The short direction WD may be referred to as a right-left direction. In the longitudinal direction LD, the direction toward the front side of the razor 1, that is, the direction from the connecting portion 4 to the head portion 3, is defined as a "longitudinal direction front side LDF". On the other hand, in the longitudinal direction LD, the direction toward the rear side of the razor 1, that is, the direction from the connecting portion 4 to the grip portion 5, is defined as a "longitudinal direction rear side LDR".

Moreover, the right and left directions in the short direction WD are defined as a "short direction right side WDR" and a "short direction left side WDL", respectively. Further, the direction crossing the longitudinal direction LD and the short direction WD is defined as a "vertical direction VD". The vertical direction VD may be referred to as a height direction of the razor 1. The side facing a top surface portion 50 of the grip portion 5 described later is defined as a "top surface side TS", and the side opposite to the top surface side TS in the vertical direction is defined as a "bottom surface side BS".

Configuration of Head Portion 3

Figure 2:
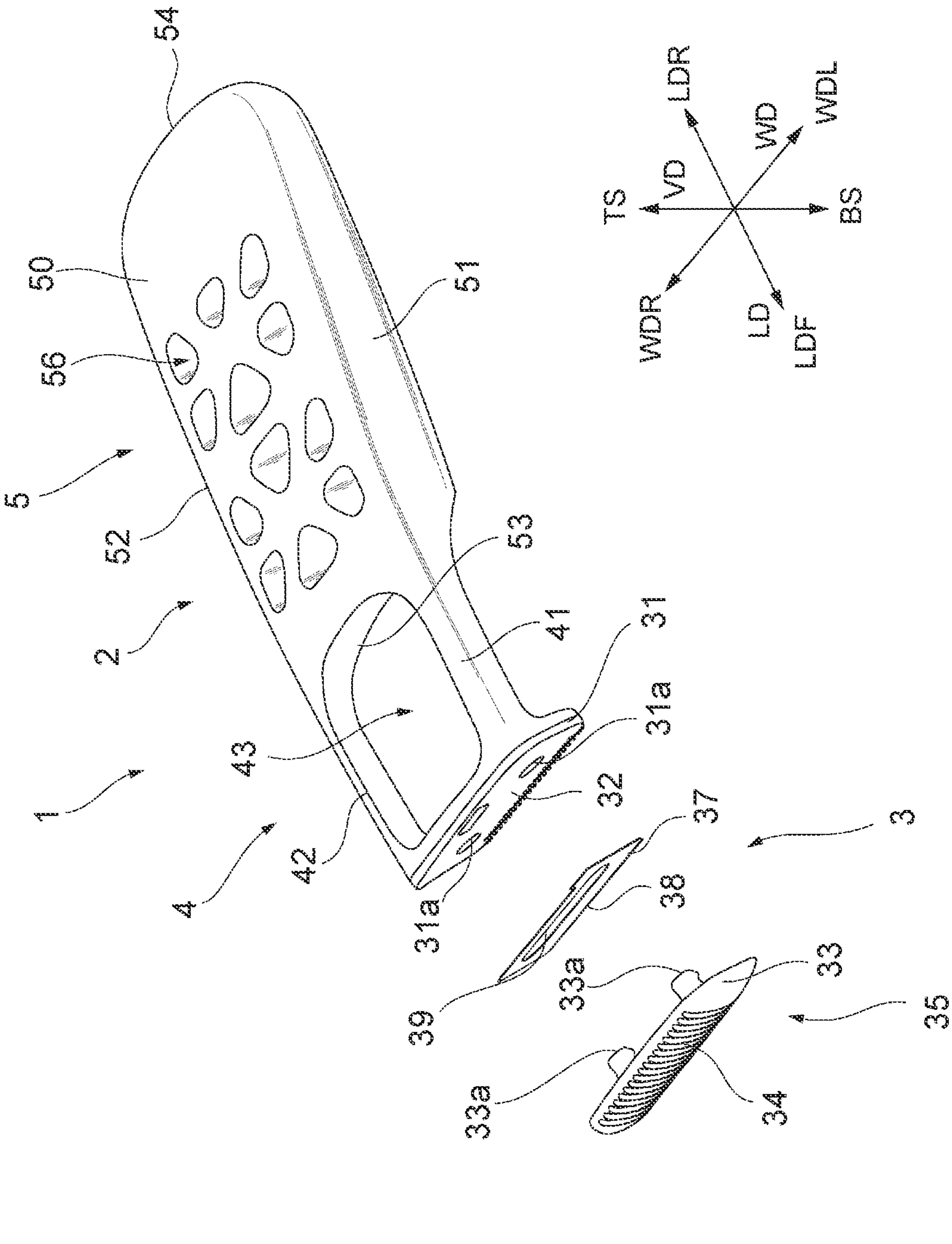
FIG. 2 is an exploded perspective view of the razor according to the embodiment.

As illustrated in the exploded perspective view of FIG. 2, the head portion 3 includes a first component body 31 and a second component body 33. The first component body 31 is integrally molded with the connecting portion 4 and the grip portion 5. The second component body 33 is molded as a separate body from the first component body 31. The second component body 33 is joined to the longitudinal direction front side LDF of the first component body 31 with the blade body 37 interposed therebetween. The second component body 33 is formed of the same material and with the same color as the first component body 31, thereby ensuring the external unity of the head portion 3.

Moreover, as illustrated in FIG. 2, the first component body 31 and the second component body 33 have a comb portion first component body 32 and a comb portion second component body 34, respectively. The comb portion first component body 32 and the comb portion second component body 34 are joined with the blade body 37 sandwiched therebetween, thereby forming a comb portion 35. The second component body 33 includes two connecting projections 33*a*. These two connecting projections 33*a* are provided so as to project from the surface facing the first component body 31 in the second component body 33 toward two through-holes 31*a* provided in the first component body 31. In the assembled state, the second component body 33 is inserted in a mounting hole 39 provided in the blade body 37 to extend in the short direction WD and the through-holes 31*a* of the first component body 31. The blade body 37 is disposed such that a blade edge 38 faces the bottom surface side BS.

In the use of the razor 1, the comb portion 35 has a function of removing body hairs to be cut and a function of performing combing treatment for aligning body hairs to be cut.

Figure 6:
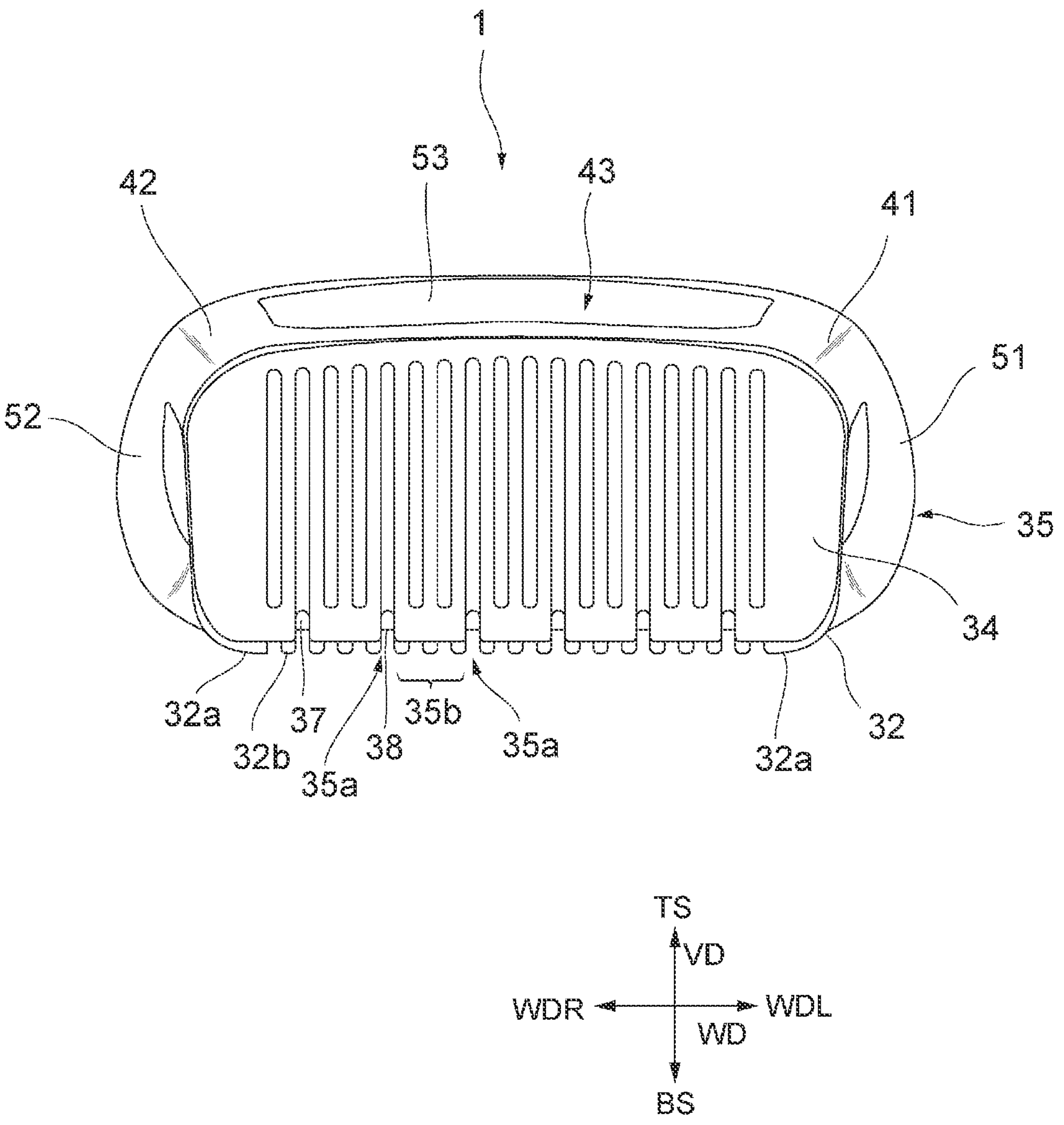
FIG. 6 is a left side view of the razor according to the embodiment.
Figure 7:
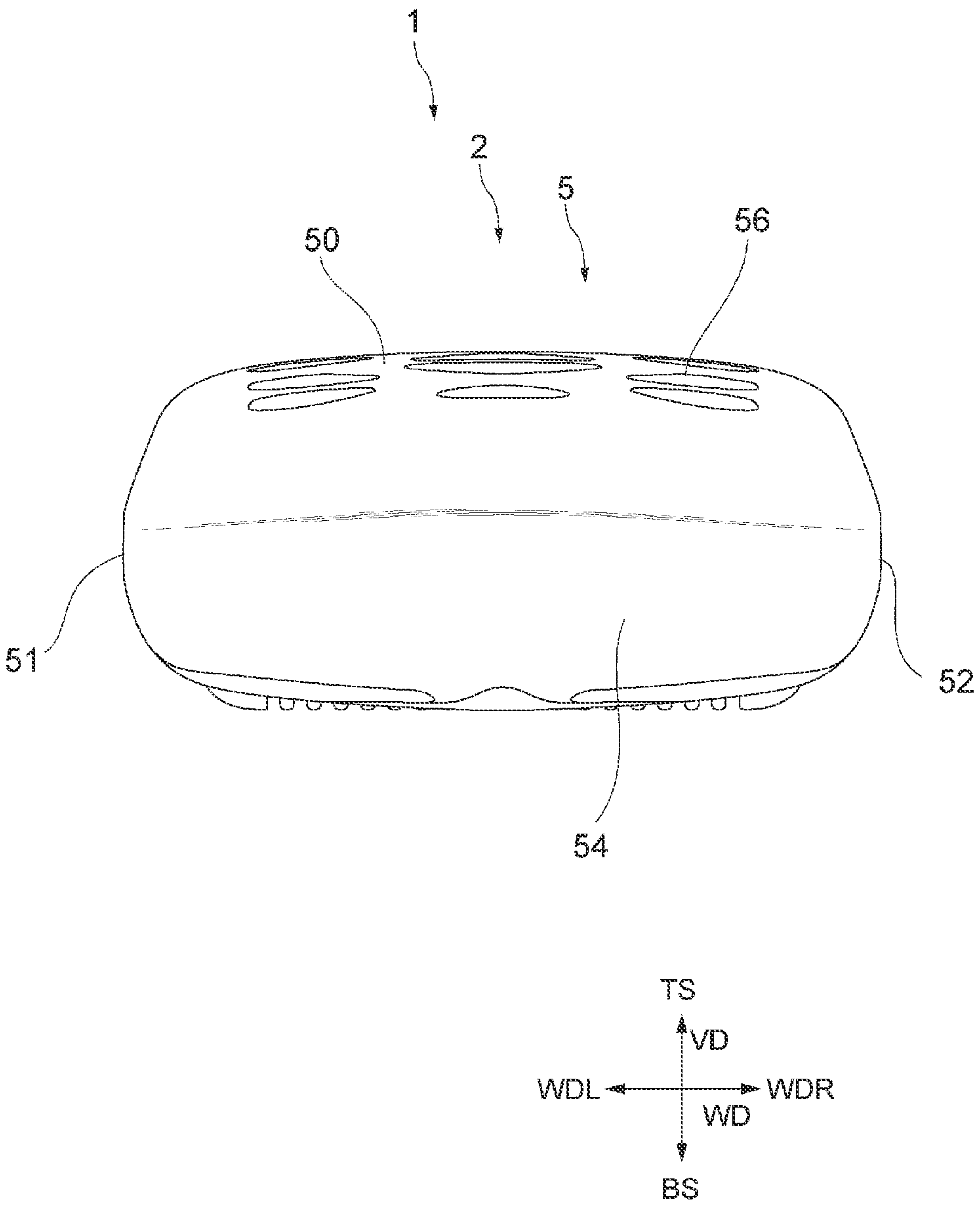
FIG. 7 is a right side view of the razor according to the embodiment.

As illustrated in FIG. 6, in the comb portion 35, the comb portion first component body 32 includes comb teeth 32*a* provided at both ends and seventeen comb teeth 32*b* arranged with the same intervals between these comb teeth 32*a*. That is, eighteen gaps between comb teeth 32*a* and 32*b* are formed in the comb portion 35. Note that to avoid concentration of numeral symbols, only a part of the comb teeth 32*b* is represented with numeral symbols in the drawing. In the same manner for other numeral symbols, only a part of the components of the same kind may be represented with numeral symbols to avoid concentration of the numeral symbols. In the present specification, a gap between a center portion in the short direction WD of the comb tooth 32*b* and a center portion in the short direction WD of the adjacent tooth 32*b* is referred to as a "disposition pitch". In the enlarged view of FIG. 8, the length A corresponds to the disposition pitch.

Figure 8:
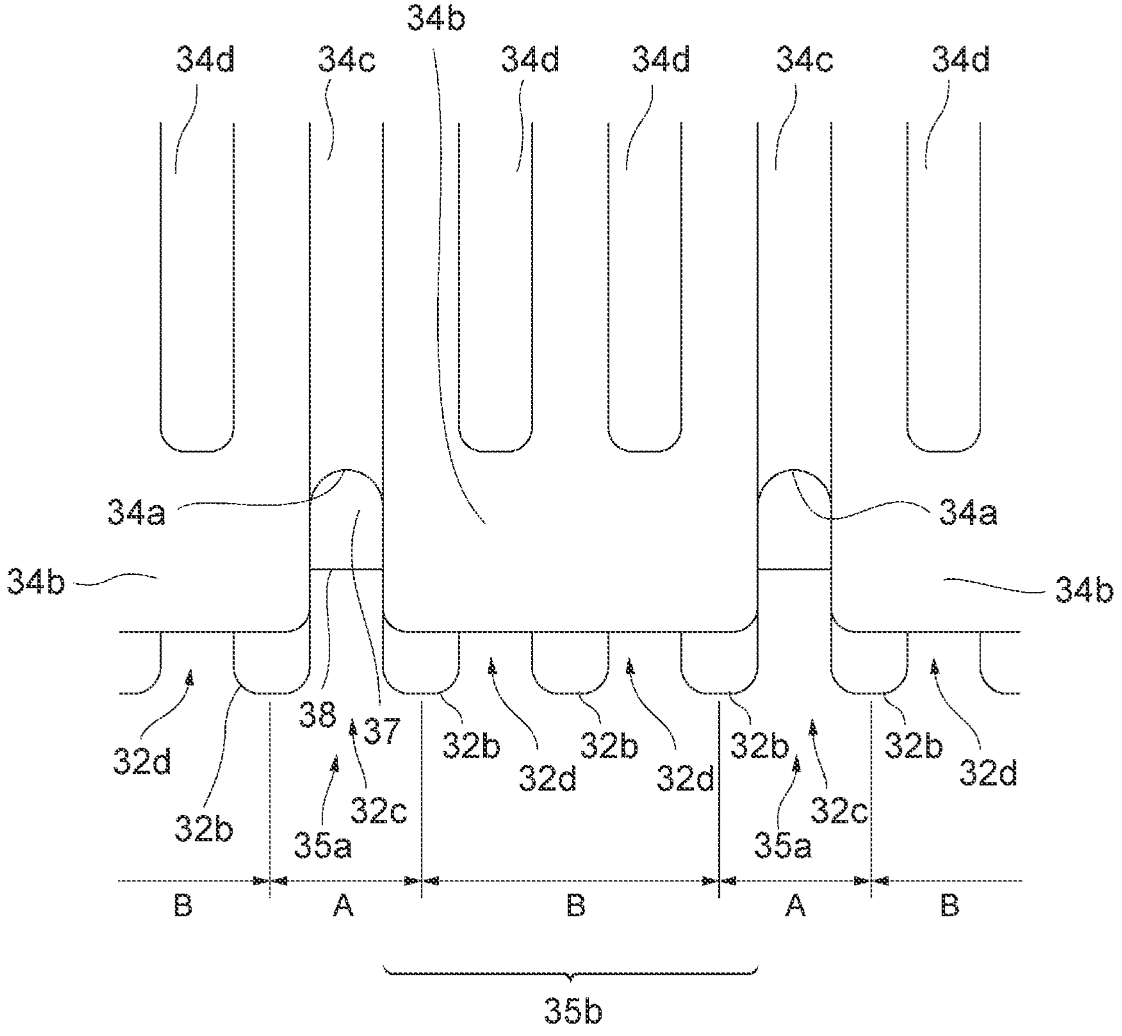
FIG. 8 is an enlarged view of a comb portion of the razor according to the embodiment.
Figure 9:
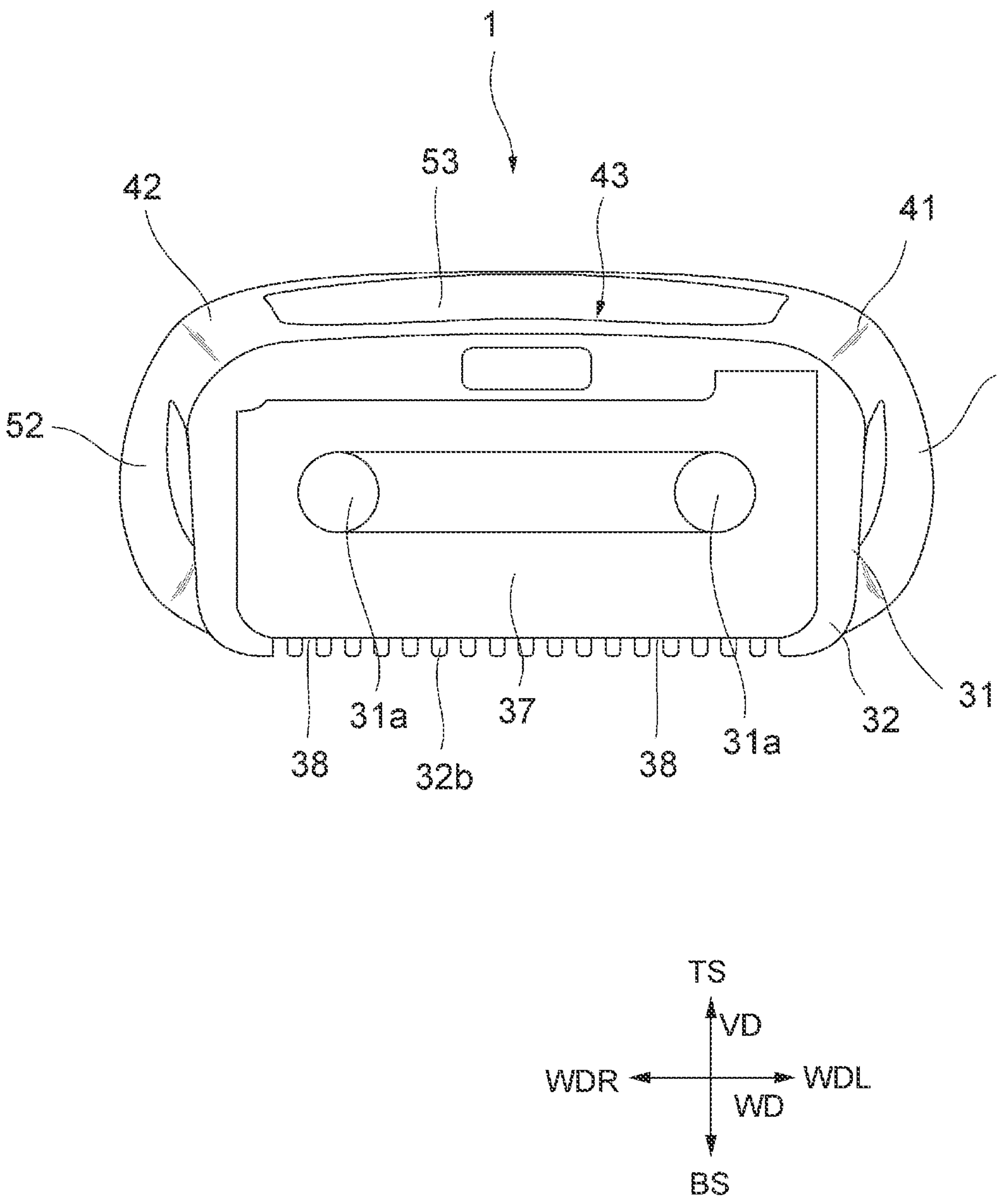
FIG. 9 is a left side view of the razor according to the embodiment, in which a second component body is removed.

The length in the short direction WD, that is, the width, of the comb tooth 32*b* is approximately the same as the length in the short direction WD, that is, the width, of the gap between the comb teeth 32*a* and 32*b*. As illustrated in FIGS. 6 and 8, the comb portion 35 includes blade edge exposed portions 35*a* where the blade edge 38 of the blade body 37 is exposed, and cover portions 35*b* where the blade edge 38 is covered as not to be exposed. The comb teeth 32*b* are disposed at both ends in the short direction WD of the blade edge exposed portion 35*a*. The comb tooth 32*a* or 32*b* is provided at both ends in the short direction WD of the cover portion 35*b*, and the comb tooth 32*b* is further provided therebetween. The razor 1 has a configuration in which a plurality of sets of the blade edge exposed portion 35*a* and the cover portion arranged in a predetermined manner are disposed. With this configuration, it is possible to easily dispose the blade edge exposed portions 35*a* with the same intervals and easily remove body hairs uniformly.

In the present embodiment, as illustrated in FIGS. 6 and 8, the cover portion 35*b* is provided between the exposed blade edge portions 35*a*. In the cover portion 35*b*, the comb tooth 32*b* is provided in the center in the width direction between the comb teeth 32*b* at both ends. That is, in one cover portion 35*b*, two gaps are formed by the comb teeth 32*b*. In other words, the comb portion 35 includes gaps 32*c* between comb teeth with blade edge exposed where the blade edge 38 is exposed and gaps 32*d* between comb teeth with blade edge covered, and two gaps 32*d* between comb teeth with blade edge covered are disposed between the gaps 32*c* between comb teeth with blade edge exposed. In the comb portion 35, the set of the blade edge exposed portion 35*a* and the cover portion 35*b* arranged in this manner is disposed repeatedly.

As illustrated in FIG. 8, in the blade edge exposed portion 35*a*, the comb portion second component body 34 includes a concave portion 34*a* having the same width as the gap of the comb teeth, so that the blade edge 38 is exposed at the position of the concave portion 34*a*. In the cover portion 35*b*, the comb portion second component body 34 includes a blade edge cover 34*b*, so that the blade edge 38 is covered by the blade edge cover 34*b*.

Figure 10:
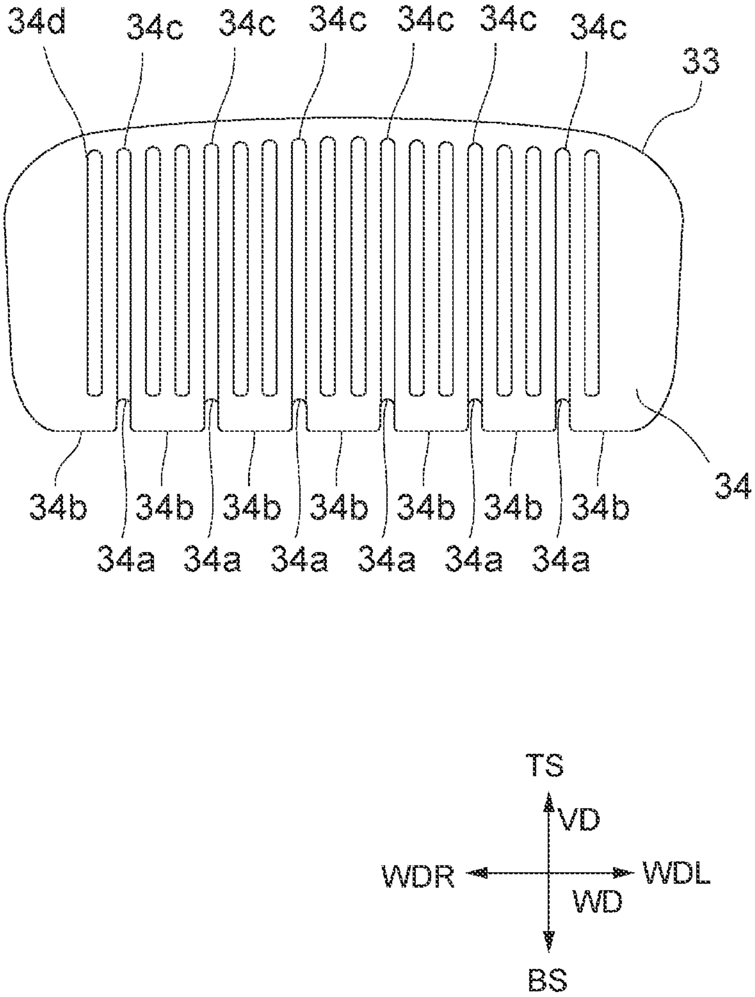
FIG. 10 is an enlarged view of the second component body of the razor according to the embodiment.

As illustrated in FIGS. 6, 8, and 10, the comb portion second component body 34 includes first groove portions 34*c* and second groove portions 34*d* extending in the vertical VD, which are each formed on the extended line of a gap between the comb teeth 32*a* and 32*b*. The first groove portion 34*c* is formed on the extended line of the concave portion 34*a* in the vertical direction VD so as to be continuous from the concave portion 34*a*. The second groove portion 34*d* is formed on the extended line of a gap between the comb teeth 32*a* and 32*b* in the cover portion 35*b*, starting from a position separate from the gap between the comb teeth 32*a* and 32*b*. The first groove portion 34*c* and the second groove portion 34*d* are formed to extend to the vicinity of the end of the top surface side TS in the comb portion second component body 34. The first groove portion 34*c* and the second groove portion 34*d* are formed to have the same width in the width direction. Note that in the present specification, the first groove portion 34*c* and the second groove portion 34*d* may be collectively referred to as "groove portions".

In this manner, the comb portion 35 has a function of performing combing treatment for aligning body hairs to be cut, with a plurality of comb teeth 32*a* and 32*b*. The comb portion 35 further has a function of removing body hairs to be cut, with the blade edge exposed portions 35*a* arranged alternately with the cover portions 35*b*. Therefore, the comb portion 35 can suppress hindering of cutting processing due to intertwined body hairs. That is, the body hairs to be treated are aligned by the comb portion 35 formed adjacent to the blade body 37, and then sent to the blade body 37 for cutting. Such a configuration is particularly useful because the direction in which body hairs grow is not constant at intimate areas.

In the razor 1 of the present embodiment, there is adopted the configuration in which in the short direction WD of the comb portion 35, the ratio of the total of the lengths A (see FIG. 8) between the center portions in the width direction of the comb teeth 32*b* adjacent to the blade edge exposed portion 35*a*, relative to the length between the center portions of the comb teeth 32*a* at both ends, is approximately ⅓. Moreover, there is adopted the configuration in which the ratio of the total of the lengths B (see FIG. 8) between the center portions in the width direction of the comb teeth 32*b* at both ends of the cover portion 35*b*, relative to the length between the center portions of the comb teeth 32*a* at both ends, is approximately ⅔. In other words, in the eighteen gaps between the comb teeth 32*a* and 32*b*, ⅓ is the gaps 32*c* between comb teeth with blade edge exposed, and the remaining ⅔ is the gaps 32*d* between comb teeth the blade edge covered.

According to the research by the inventors, it has been found that in a case where the exposure of the blade is purposely reduced with the ratio of the total of the length between the center portions in the width direction of the comb teeth 32*b* adjacent to the blade edge exposed portion 35*a*, relative to the length between the center portions of the comb teeth 32*a* at both ends, being 1/10 or larger but not exceeding 4/10, that is, 10% or higher but not exceeding 40%, it is possible to reduce the amount of body hairs by gradually cutting them while checking the situation, which is the configuration suitable for cutting the amount of body hairs desired by the user. It has been found that especially with the above-described ratio being ⅓, the configuration is particularly suitable for cutting the amount of body hairs desired by the user. Therefore, the razor 1 adopts such a configuration.

In the razor 1 of the present embodiment, the disposition pitch of the comb teeth 32*a* and 32*b* in the comb portion 35 is preferably 0.5 mm or larger but not exceeding 2.0 mm, and is approximately 1.0 mm, for example. The width of the gap between the comb teeth 32*a* and 32*b* is preferably a half of the above-described disposition pitch, and is approximately 0.5 mm, for example. The width of the comb tooth 32*b* is preferably a half of the above-described disposition pitch, and is approximately 0.5 mm, for example. In the razor 1, the length of the comb portion 35 in the width direction thereof is preferably 10 mm or larger but not exceeding 35 mm.

Figure 4:
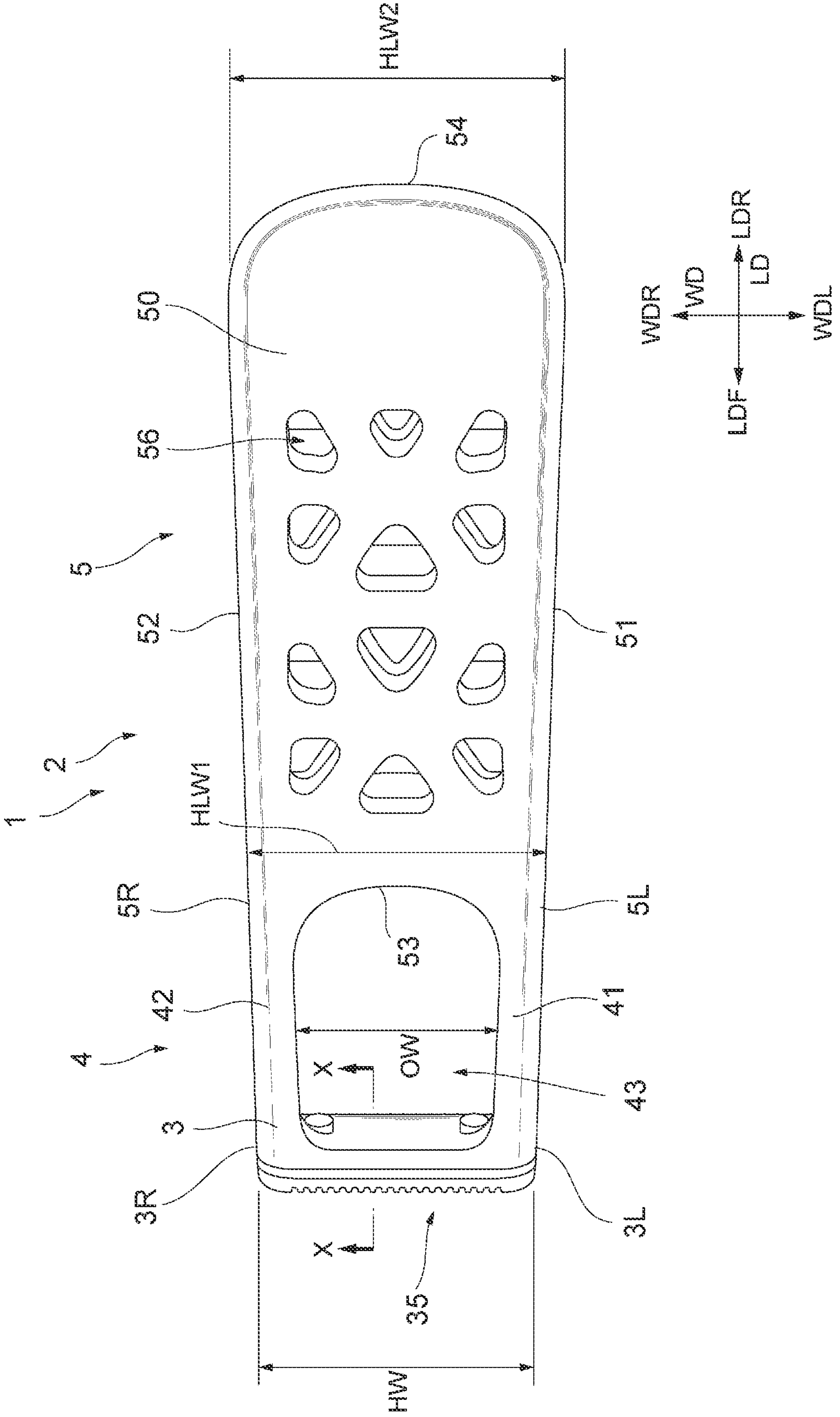
FIG. 4 is a plane view of the razor according to the embodiment.
Figure 11:
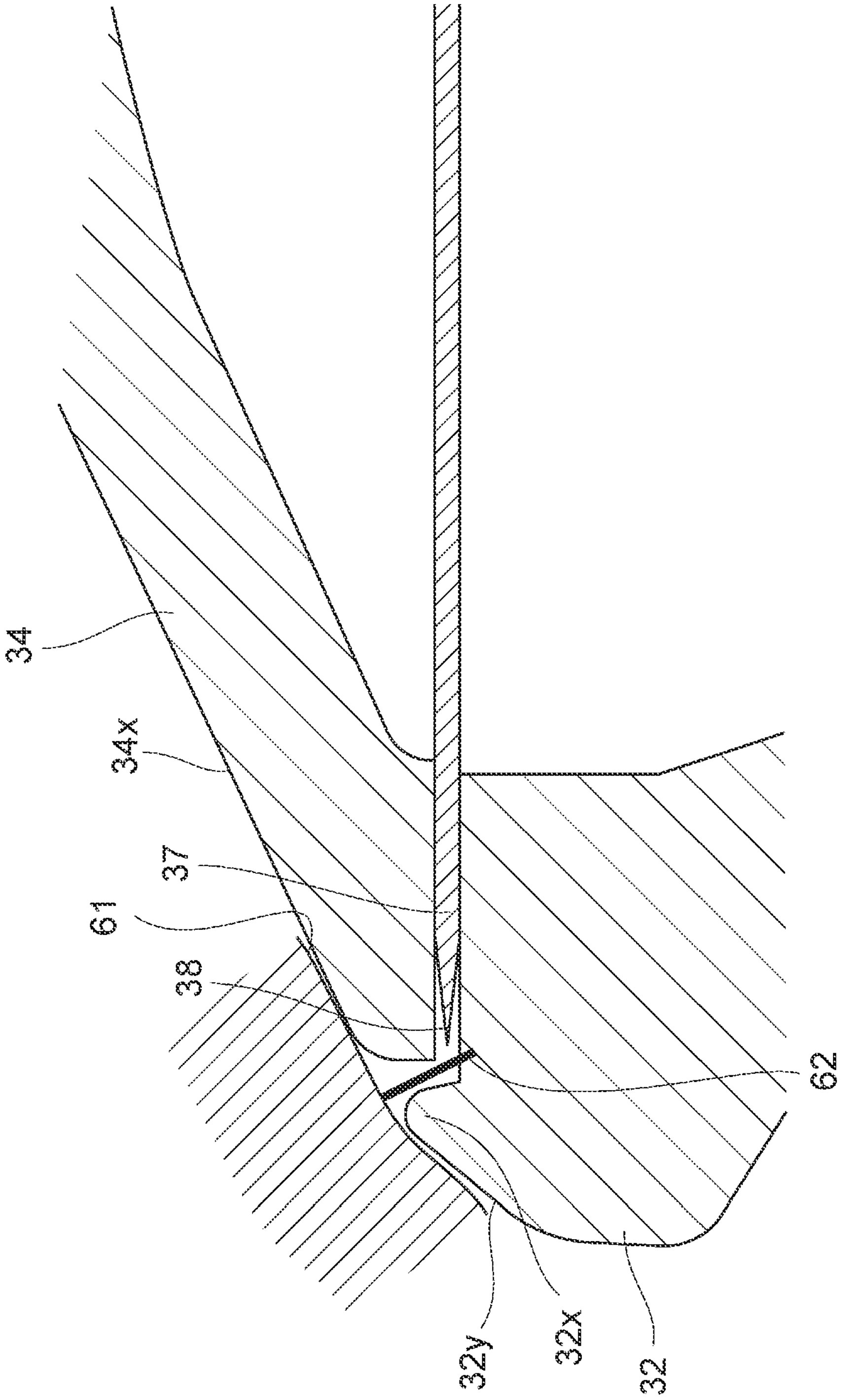
FIG. 11 is a section view at a position X-X of FIG. 4.

FIG. 11 is a section view at a position X-X of FIG. 4. At this position, the blade edge cover 34*b* of the comb portion second component body 34 is formed. The comb portion first component body 32 includes a projection 32*x* provided at a position facing the blade cover 34*b*. The projection 32*x* is formed to project from the comb portion first component body 32 so as to have an outer surface 32*y* along the extended surface of an outer surface 34*x* of the comb portion second component body 34. In the use of the razor 1, these outer surfaces 34*x* and 32*y* are in contact with the user's skin 61, and at the same time body hairs 62 come into contact with the blade edge 38 located at a position approximately 0.3 mm apart from the position of the outer surfaces 34*x* and 23*y*, whereby the body hairs 62 are cut. Thus, the blade edge 38 is not directly in contact with the user's skin 61 during the use, thereby reducing the burden on the skin 61. Moreover, during the use, body hairs are cut not in their upright state but in their fallen, inclined state, thus resulting in a cutting method of shaving hair tips. Therefore, the hair tips of body hairs after removal can be smooth, which suppresses a feeling of pain even when such a part touches other parts of the body.

Configuration of Connecting Portion 4

As illustrated in FIGS. 1 and 2 etc., the connecting portion 4 includes a first connecting element 41 and a second connecting element 42. Moreover, a penetrating opening portion 43 facing both the top surface TS and the bottom surface BS is formed between the first connecting element 41 and the second connecting element 42. The penetrating opening portion 43 is configured to have an opening width dimension OW equivalent to approximately 60% of the head portion 3 in the short direction WD so that the comb portion 35 and the blade body 37 are directly visible from the top surface TS side through the penetrating opening portion 43.

Configuration of Grip Portion 5

Figure 3:
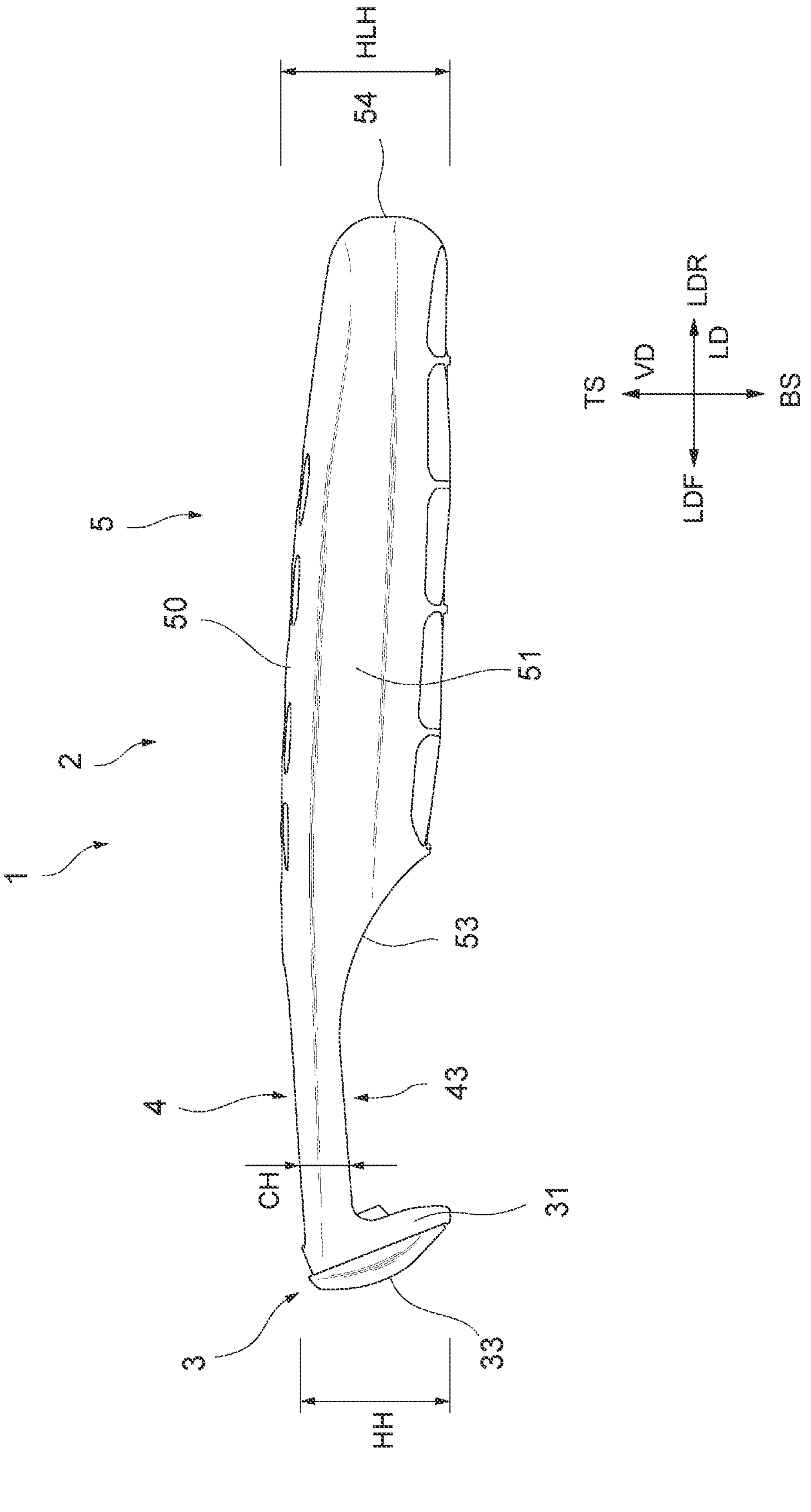
FIG. 3 is a front view of the razor according to the embodiment.

As illustrated in FIGS. 1 to 3, the grip portion 5 is formed to extend in the longitudinal direction LD, and is mainly formed by the top surface portion 50, a first side wall portion 51, a second side wall portion 52, a front surface portion 53, and a rear surface portion 54. The first side wall portion 51 and the second side wall portion 52 are formed to extend from both ends in the short direction WD of the top surface portion 50 in a direction crossing the surface direction of the top surface portion 50, that is, in the vertical direction VD. Moreover, a bottom surface side opening portion 55 is formed on the bottom surface side BS of the grip portion 5. A plurality of through-holes 56 are formed on the top surface portion 50. The through-holes 56 are formed so as to avoid interference with ribs 57 and auxiliary ribs 58 described later.

Configuration of Rib 57

Figure 5:
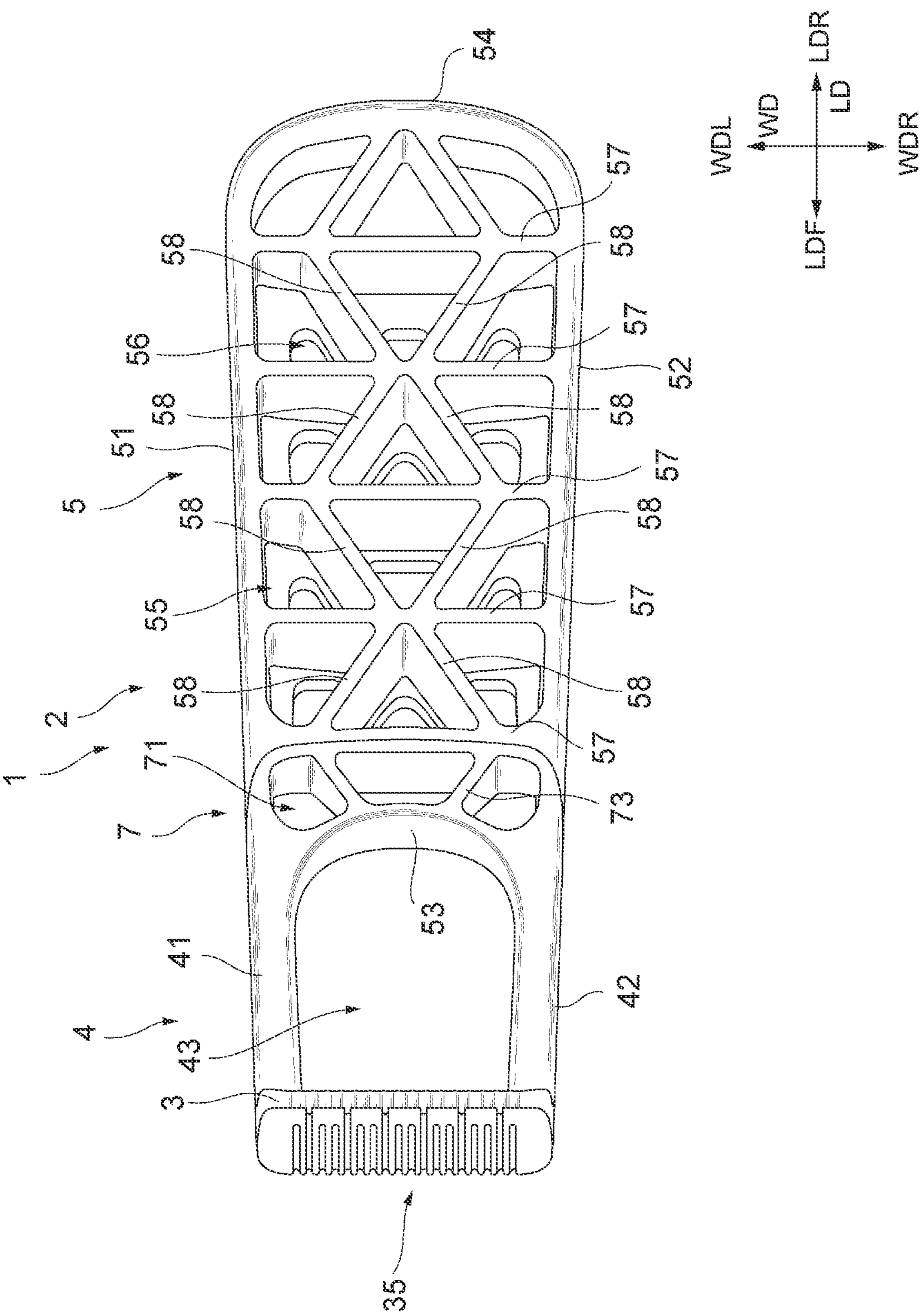
FIG. 5 is a bottom view of the razor according to the embodiment.

As illustrated in FIG. 5, the grip portion 5 is formed in a hollow shape, and at the hollow shaped region, a plurality of ribs 57 are formed with the same intervals in the longitudinal direction LD direction such that the ribs 57 integrally connects the first side wall portion 51, the second side wall portion 52, and the top surface portion 50. In the present embodiment, a total of five ribs 57 are disposed at the same pitches of approximately 10 mm. These ribs 57 are formed as an integrally molded body made of resin with the head portion 3, the connecting portion 4, and the grip portion 5. Moreover, the ribs 57 are configured to be disposed in an inclined manner with respect to both the longitudinal direction LD and the vertical direction VD, which enhances the strength rigidity in a plurality of directions.

Configuration of Auxiliary Rib 58

As illustrated in FIG. 5, in the hollow portion of the grip portion 5, the auxiliary ribs 58 are formed in addition to the ribs 57. The auxiliary rib 58 is formed to extend in a crossed manner with respect to the longitudinal direction LD and the short direction WD and in a crossed manner with respect to the vertical direction VD. Moreover, the auxiliary rib 58 is formed symmetrically and in pair across the center line in the longitudinal direction LD, and extends in a wave manner in the longitudinal direction LD. As a result, the auxiliary ribs 58 appear V-shapes or X-shapes in series.

In this manner, the auxiliary ribs 58 are formed in a crossed manner, symmetrically, and further in a wave manner, whereby the reinforcing structure can be provided in a dense manner throughout the grip portion 5, and thus the rigidity strength of the grip portion 5 can be enhanced. Moreover, with such disposition characteristics of the auxiliary ribs 58, it is possible to add an accent to the exterior design of the grip portion 5 and the razor 1 and improve the design taste.

Configuration of Connecting Portion Rib 73

In the connecting portion 4, an opening concave portion 71 is formed in a grip portion adjacent region 7 that is adjacent to the grip portion 5. The concave portion 71 is provided with connecting portion ribs 73. Similarly to the auxiliary rib 58, the connecting portion rib 73 is formed to extend in a crossed manner with respect to the longitudinal direction LD, the short direction WD, and the vertical direction VD.

Features Related to Width Dimension

As illustrated in FIG. 4, the width dimension in the short direction WD of the grip portion 5 (hereinafter also referred to as "HLW") is set to be equal to or larger than the width dimension HW in the short direction WD of the head portion 3 at any region in the longitudinal direction, from the width dimension HLW 1 at the minimum region (connecting portion adjacent region) to the width dimension HLW2 at the maximum region. Furthermore, there is adopted the configuration in which the width dimension HLW of the grip portion 5 is gradually (sequentially or successively) increased, that is, gradually increased toward the side apart from the head portion 3 in the longitudinal direction LD.

In the present embodiment, the minimum width dimension HLW1 of the grip portion 5 is set to approximately 25 mm (millimeters), the maximum width dimension HLW2 thereof is set to approximately 28 mm (millimeters), and the width dimension HW of the head portion 3 is set to approximately 23 mm (millimeters).

Connecting Aspect of Connecting Portion 4

As illustrated in FIG. 4, the connecting portion 4 is configured to linearly connect the left and right both ends 3L and 3R in the short direction WD of the head portion 3 and the left and right both ends 5L and 5R in the short direction WD of the grip portion 5, respectively. In other words, the connecting portion 4 is configured to connect, with the shortest distance, both of the ends 3L and 3R in the short direction WD of the head portion 3 and both of the ends 5L and 5R in the short direction WD of the grip portion 5.

With such a configuration, it is possible for the size of the grip portion 5 to be set to the same size as the head portion 3 or larger, and for the gripping form of the grip portion 5 to be diversified by users. With the diversified gripping forms, even in the body hair cutting treatment at intimate areas such as a genital region and an armpit, the user is allowed to appropriately select a gripping form from a wide variety of gripping forms, thereby enabling the user to perform a fine operation control of the razor 1. Furthermore, with the above-described gradual increase configuration of the width dimension, the width dimension of the longitudinal direction front side LDF of the grip portion 5 with which the user's fingers come into contact is set to be relatively small, while the width dimension of the longitudinal direction rear side LDR of the grip portion 5 with which the user's palm comes into contact is relatively large. Thus, from a standpoint of ergonomic aspects, both the gripping with securely exerted gripping strength and the intended precise and accurate operations are possible.

Furthermore, the connecting portion 4 linearly connects both of the ends 3L and 3R of the head portion 3 and both of the ends 5L and 5R of the grip portion 5, respectively, which highly secures assembling rigidity of the head portion 3 and the grip portion 5 and enhance durability of the razor 1.

Features Related to Vertical Direction

In the present embodiment, as illustrated in FIG. 3, in the vertical direction VD, the height of the first connecting element 41 and the second connecting element 42, that is, the connecting portion height dimension CH is set to be smaller than the height of the head portion 3 (that is, the head portion height dimension HH) and the height of the grip portion 5 (that is, the grip portion height dimension HLH). To be more specific, the head portion height dimension HH is set to approximately 11 mm, the connecting portion height dimension CH is set to approximately 4 mm, and the grip portion height dimension HLH is set to approximately 13 mm.

Note that in the present embodiment, mainly from a viewpoint of design taste, the head portion 3, the connecting portion 4, and the grip portion 5 are each subjected to round processing or processing of gradually decreasing or increasing the dimensions. Therefore, each height dimension is explained using the largest dimension or the smallest dimension of each part.

With such a configuration, when the head portion 3 is made approach a region that is difficult to access, especially in the body hair treatment at an intimate area, the connecting portion 4 with a compact size in the vertical direction VD does not hinder the operation. Moreover, it is possible to construct a form in which the bending rigidity of the connecting portion 4 is appropriately adjusted, for example, so as to allow or regulate a rotation operation of the head portion 3 relative to the grip portion 5. With appropriate change in dimensions of the head portion 3, the connecting portion 4, and the grip portion 5 with respect to the vertical direction VD, an accent can be added to the exterior shape of the razor 1 so as to improve the design taste.

Use of Razor 1

When using the razor 1, the user repeatedly strokes the razor 1 a plurality of times against an intimate area while checking each time the status of body hair removal. Here, because the razor 1, provided with the comb teeth 32*a* and 32*b* and the groove portions 34*c* and 34*b*, is configured to be able to effectively perform combing treatment, it is possible to remove body hairs while aligning them by repeated strokes. Moreover, in the razor 1, the blade edge exposed portion 35*a* is not provided throughout the width direction but is provided only for ⅖ or smaller in the width direction, which is a configuration particularly suitable for the method of gradually reducing the amount of body hairs while observing the situation.

Features of Razor 1

The razor 1 of the present embodiment has the following features, for example.

In the razor 1, the ratio of the blade edge exposed portion 35*a* where the blade edge 38 is exposed is set to ⅖ or smaller with respect to the length in the width direction of the comb portion 35, which is a configuration allowing the user to easily remove the desired amount of body hairs to be cut.

Moreover, in the razor 1, a plurality of comb teeth 32*a* and 32*b* are disposed with the intervals of 2 mm or smaller, whereby the width of the blade edge exposed portion 35*a* becomes relatively small, and the width for cutting body hairs at once becomes relatively narrow. With the intervals between the comb teeth 32*a* and 32*b* set to 2 mm or smaller in this manner, the boundary between the part where body hairs are cut and the part where body hairs are not cut can be effectively blurred, which is a configuration that meets the users' needs for the natural state with an unclear boundary between the part where body hairs are removed and the part where body hairs are not removed.

Furthermore, with the intervals between the comb teeth 32*a* and 32*b* set to 2 mm or smaller, it is difficult for the skin to enter between the comb teeth. Therefore, it is possible to suppress the user's skin from touching the blade edge, thereby suppressing the user's discomfort or preventing the user's skin from being damaged.

The razor 1 is configured to include a plurality of comb teeth 32*a* and 32*b*, and in the cover portion 35*b*, the comb tooth 32*a* is provided not only at both ends thereof but also between both of the ends. Thus, it is possible to effectively perform combing treatment while cutting body hairs to be cut, as compared with the configuration in which the comb tooth 32*b* is provided only at both ends of the cover portion 35*b*. Therefore, it becomes easy to remove body hairs to be cut with the next stroke. Moreover, because the intervals between the comb teeth 32*a* and 32*b* is 2 mm or smaller in width, body hairs can be combed with fine intervals so as to effectively adjust a coat of hair.

With the configuration having a plurality of groove portions including the first groove portions 34*c* and the second groove portions 34*d*, it is possible to remove body hairs while performing combing treatment on body hairs to be cut more effectively. The razor 1 is mainly used for the intimate areas where the growing directions of body hairs are not constant, and such a configuration excellent in performance of combing treatment facilitates ease of cutting body hairs to be cut at the intimate areas.

In the razor 1, the comb portion first component body 32 includes comb teeth, and the comb portion second component body 34 includes concave portions 34*a* at positions corresponding to the blade edge exposed portions 35*a*, and blade edge covers 34*b* at positions corresponding to the cover portions 35*b*. With such a configuration, it is possible to achieve a configuration in which the disposition and pitch of the comb teeth and the ratio of the comb teeth exposed portion and the cover portion can be changed by changing the shape of one of the comb portion first component body 32 and the comb portion second component body 34.

Moreover, in the razor 1, the first groove portion 34*c* is formed at a position continuous from the concave portion 34*a*, and the second groove portion 34*d* is formed at a position slightly apart from the gap of the comb teeth 32*b* on the extended line of the position of the gap of the comb teeth 32*b* in the blade edge cover 34*b*. With this configuration, the groove portions are formed in a wide range in the area where the comb teeth 32*a* and 32*b* of the comb portion 35 are disposed, thereby allowing the combing treatment to be performed more effectively. As a result, it becomes easier to cut body hairs more comfortably.

The razor 1 is configured to include the projection 32*x*, as illustrated in FIG. 11. Thus, the blade edge 38 does not directly touch the user's skin, which is a skin-friendly configuration. In particular, the razor 1 is mainly used for intimate areas, and thus such a skin-friendly configuration is particularly useful.

Moreover, in the razor 1, it is particularly preferable that the ratio of the total of the length between the center portions in the width direction of the comb teeth 32*b* adjacent to the plurality of blade edge exposed portions 35*a*, relative to the length between the center portions in the width direction of the comb teeth 32*a* at the outermost positions in the width direction of the comb portion 35, is ⅓. With such a configuration, the razor 1 has a configuration particularly suitable for cutting the amount of body hairs desired by the user.

INDUSTRIAL APPLICABILITY

The intimate area thinning razor according to the present invention is particularly suitably applied as a thinning razor for reducing the amount of hairs at intimate areas.

REFERENCE SIGNS LIST

1 razor
2 razor holder
3 head portion
31 first component body
31*a* through-hole
32 comb portion first component body
32*a*, 32*b* comb tooth
32*c* gap between comb teeth with blade edge exposed
32*d* gap between comb teeth with blade edge covered
32*x* projection
33 second component body
33*a* connecting projection
34 comb portion second component body structure
34*a* concave portion
34*b* blade edge cover
34*c* first groove portion
34*d* second groove portion
35 comb portion
35*a* blade edge exposed portion
35*b* cover portion
37 blade
38 blade edge
39 mounting hole
4 connecting portion
41 first connecting element
42 second connecting element
43 penetrating opening portion
5 grip portion
50 top surface portion
51 first side wall portion
52 second side wall portion
53 front surface portion
54 rear surface portion
55 bottom surface side opening portion
56 through-hole
57 rib

58 auxiliary rib

7 grip portion adjacent region

71 concave portion

73 connecting portion rib

What is claimed is:

1. An intimate area thinning razor for reducing an amount of hairs at an intimate area, the thinning razor comprising:

a grip portion that is formed to extend in a predetermined longitudinal direction and is graspable by a user;

a head portion that is formed to extend in a width direction crossing the longitudinal direction, and includes a blade body and a comb portion formed adjacent to the blade body; and a connecting portion that connects the grip portion and the head portion, wherein the comb portion includes a comb portion first component body integrally formed with the head portion, and a comb portion second component body provided to face the comb portion first component body, and the blade body is sandwiched between the comb portion first component body and the comb portion second component body, wherein the comb portion includes a plurality of comb teeth, and includes a blade edge exposed portion where a blade edge of the blade body is exposed and a cover portion where the blade edge of the blade body is covered as not to be exposed, and the comb teeth are provided at both ends in the width direction of the cover portion and between both of the ends, and a set of the blade edge exposed portion and the cover portion arranged in a predetermined manner is disposed repeatedly, wherein a ratio of a total of lengths between center portions in the width direction of the comb teeth adjacent to the plurality of blade edge exposed portions, relative to a length between center portions in the width direction of the comb teeth at outermost positions in the width direction of the comb portion, is in the range of 1/10 to 4/10, wherein the comb portion second component body includes a plurality of groove portions each formed on an extended line of a gap between the comb teeth, and wherein a length in the width direction of the comb portion thereof is 10 mm or larger, and the plurality of comb teeth are provided with intervals of 2 mm or smaller.

2. The intimate area thinning razor according to claim 1, wherein the plurality of comb teeth are formed in the comb portion first component body, and wherein the comb portion second component body includes a concave portion at a position corresponding to the blade edge exposed portion, and a blade edge cover at a position corresponding to the cover portion.

3. The intimate area thinning razor according to claim 2, wherein the groove portions of the comb portion second component body comprises:

a first groove portion that is formed at a position continuous from the concave portion; and a second groove portion that is formed at a position separate from the gap of the comb teeth on an extended line of a position of the gap between the comb teeth in the blade edge cover.

4. The intimate area thinning razor according to claim 2, wherein the comb portion first component body includes a projection having an outer surface along an extended surface of an outer surface of the comb portion second component body, at a position facing the blade edge cover in a section view at a position where the blade edge cover is formed.

5. The intimate area thinning razor according to claim 1, wherein the ratio is 1/3.

* * * * *